April 19, 1960

C. L. PETERSON 2,933,190

QUICK OPENING PRESSURE FILTER

Filed Dec. 20, 1954

INVENTOR.
C. Lynn Peterson
BY

ATTORNEYS

April 19, 1960     C. L. PETERSON     2,933,190
QUICK OPENING PRESSURE FILTER

Filed Dec. 20, 1954     4 Sheets-Sheet 2

INVENTOR.
C. Lynn Peterson
BY
McGrew & Edwards
ATTORNEYS

INVENTOR.
C. Lynn Peterson
BY
ATTORNEYS

INVENTOR.
C. Lynn Peterson
BY

ATTORNEYS

United States Patent Office 2,933,190
Patented Apr. 19, 1960

2,933,190

QUICK OPENING PRESSURE FILTER

C. Lynn Peterson, Salt Lake City, Utah, assignor to Peterson Filters & Engineering Company, Salt Lake City, Utah, a corporation Application December 20, 1954, Serial No. 476,129

6 Claims. (Cl. 210—230)

This invention relates to plate and frame pressure filter presses and more particularly to quick opening and closing filter press assemblies which greatly reduce the down time of such filter presses in cleaning and reassembling.

One of the main disadvantages of conventional pressure filters is their intermittent operation. Plate and frame pressure filters are normally taken apart and cleaned by hand at the end of each filtering cycle. Low overall efficiency and high labor costs are characteristic of conventional plate and frame filter presses. Such filters have definite advantages, however, in the recovery of a dry cake, recovery of clean filtrates, superior cake washing, and the like. The filters are, therefore, limited in use to a few special processes where the high labor cost is not overburdensome in the ultimate cost of the recovered product.

According to the present invention, there is provided an improved plate and frame pressure filter press which is opened, taken apart, cleaned, and reassembled in substantially less time and with substantially less labor than conventional plate and frame filter presses. The filter may, in fact, be made fully automatic in operation. The press of the present invention reduces filter down time and so readjusts the filter cycle that the plate and frame filter press may compete economically with so-called continuous pressure filters. The filter press, while greatly decreasing the time of the filtration cycle, still provides the advantages of conventional plate and frame pressure filter. The invention includes a vertical, stack filter, in which the plates and frames are vertically stacked one above the other, which is quickly and easily re-established from one filtering cycle to the next with a minimum of down or cake removal time, and in which a superior cake discharge is achieved.

Included among the objects and advantages of the present invention is an improved plate and frame pressure filter which is quickly and easily disassembled, cleaned and reassembled with a minimum of down time, labor time requirement, and which has a greatly improved filter cycle. The filter press may be built with either vertically or horizontally aligned plates and frames, in which the plates of the press are joined together in a series. Each plate of the series is interconnected with its neighbor in such a manner as to provide means for moving the plates a fixed distance apart which is wider than the width of an interleaved frame, so as to permit free movement of the frame in and out of register with the plates. The plates may be moved together against interleaved frames into filter relation. The series of interconnected plates is joined to one of the butt plates of the filter whereby movement of the butt plate will move all the plates toward or away from one another for quick opening and closing of the filter.

These and other objects and advantages of the invention may be readily understood by referring to the following description and the illustrations, in which.

Figure 1:
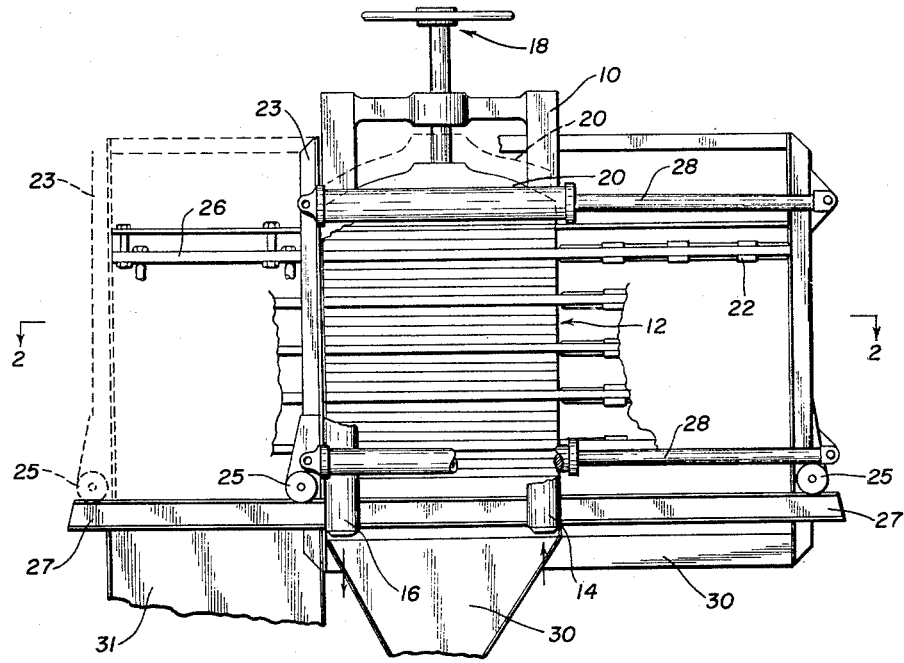
Fig. 1 is a side elevational view of a filter press, according to the invention, in filtering relation.
Figure 2:
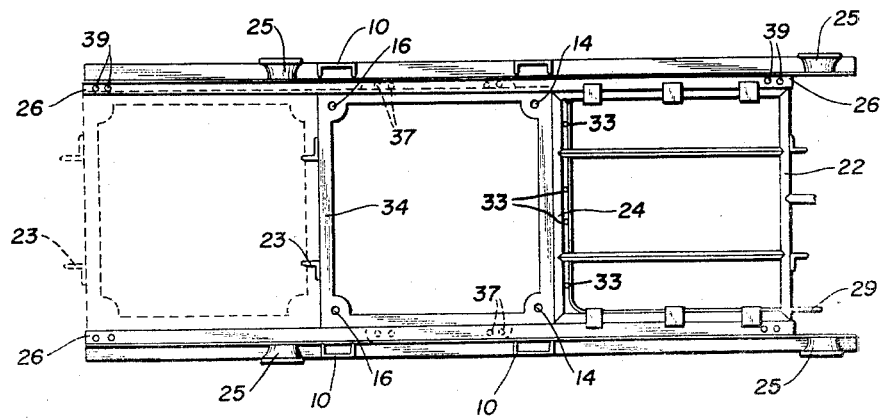
Fig. 2 is a top plan view of the filter assembly taken along section line 2—2.
Figure 3:
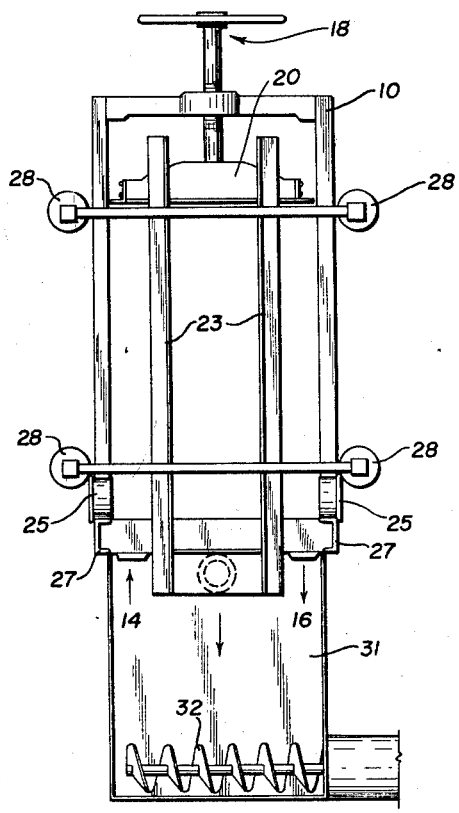
Fig. 3 is an end elevation of the filter assembly of the invention showing the cake discharge end.
Figure 4:
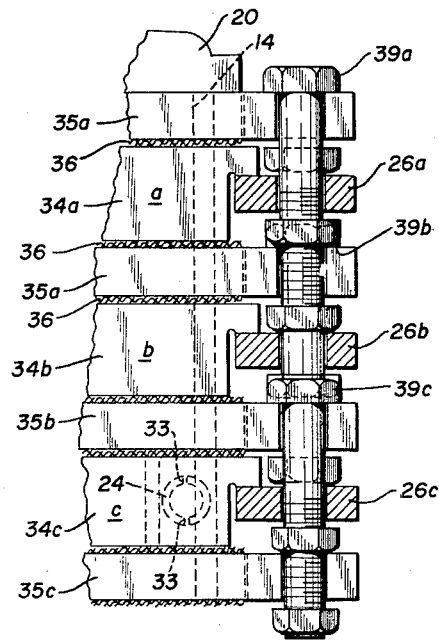
Fig. 4 is an enlarged detail of the plate joining assembly according to the invention.

In a preferred form, the device of the invention comprises a series of filter plates, vertically stacked one above the other, and a series of filter frames adapted for interleaving as a unit between the plates. The plates are connected together so that adjacent plates move together and apart within a fixed distance. The plates are adapted to be clamped in position on the interleaved frames to form a series of filter cells. The plates are adapted to be moved from a closed to a spaced apart position by movement of one of the head or butt plates so as to permit free movement of all the filter frames as a unit in and out of register with the filter plates. Guide rails are provided for moving the frames into and out of interleaved position between the plates and into and out of a position beyond the plates where the filter cake may be discharged from the frames. The guide rails move toward and away from one another in conjunction with the movement of the plates, so that the rails may be in alignment with the spaced apart plates for moving the frames in and out of register therewith. A ram-frame assembly is provided for moving the frames as a unit into and out of register with the filter plates.

The plates and frames of the filter press, in operative position, are movable within a predetermined fixed distance, and the plates are interconnected whereby the opening of the press may be simply accomplished by moving a single end or butt plate. As the end plate moves away or toward the unit, the first adjacent plate is moved, then the next plate, and so forth progressively to the opposite end plate. When the head or top plate is the lifter plate, the press is opened by lifting the head plate up away from the closed press. On opening the press, the first plate is lifted off the first frame, and then that frame is lifted off the second plate which is then in turn lifted off the second frame, and so forth. The procedure is repeated down to the bottom plate. With the filter in open position, a ram frame moves all the frames along the guide rails over a filter cake collector, the cake falling out of the frames as they leave the confines of the plates. The ram-frame assembly may be fitted with washing means so that the plates are washed after the frames are withdrawn from the stack.

In the device illustrated in Figs. 1 through 6, an upright frame assembly 10 is adapted to hold a series of stacked plates and frames 12 in substantially vertical position. A slurry or prefilt inlet 14 feeds material to be filtered into the filter press, and a filtrate outlet 16 removes filtrate from the press. A hand screw 18 operating on a head plate 20 clamps the series of plates and frames 12 in filtering position. A ram-frame assembly 22 has a series of frame rams 24, one abutting each frame, for pushing the frames along frame guide rails 26. The guide rails 26 are secured together in a manner similar to the plates, as hereinafter more fully explained, and the frames ride the guide rail from a filtering position beneath the head 20 to a cake dumping position outside the frame. The front ram-frame assembly 23 pushes the frames back into filtering position after the cake in the frames has been dumped. The ram-frame assembly may be operated by means of hydraulic cylinders 28, or any suitable means. The ram-frame assembly is supported on wheels 25 which are mounted on rails 27 for easy movement. The wheeled assembly is very valuable where the filter is large. The frame rams 24 may be partially made of pipe, and a wash liquid may be introduced into the ram frame by means of a wash liquid inlet 29. Upper and lower spray outlets 33 in the ram frame 24 are spaced to provide sufficient wash liquid for the filter medium and the plates after the frames have been moved from between the plates. A trough 30 is provided to catch the wash down liquid. On removal of the frames from their interleaved position, the cake falls from the frames into a cake discharge conduit 31. A screw conveyor 32 removes the discharged cake from the conduit 31.

The filtering area, i.e., the plate backing area or plate face, and the fluid passages or channels through the plates and the frames may be any conventional design. The plates and frames are mounted in conventional interleaved manner with a frame 34 mounted between two plates 35, Fig. 4, and a filter medium 36 is placed on the face of each plate so as to form a filter cell. Slurry or prefilt under pressure is introduced into the frame through slurry inlet or feed channel 14, and filtrate passes through the filter medium along the face or backing area of the plate and out through the filtrate outlet 16. The cake is deposited in the frame 34 between the filter medium 36 on each side of each frame.

Figure 5:
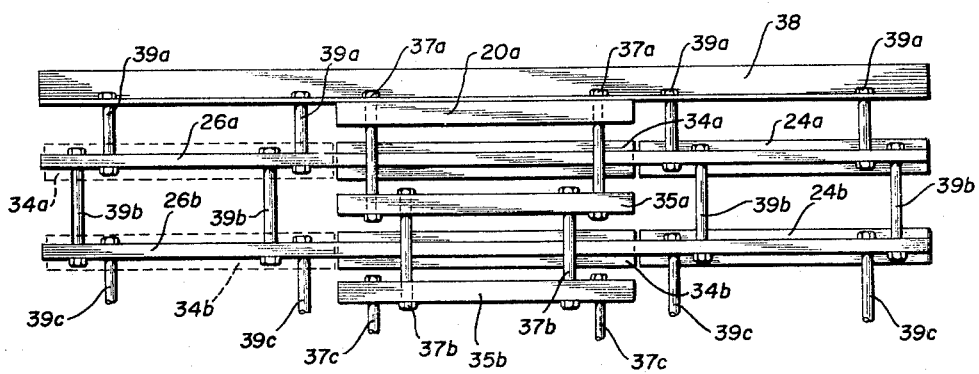
Fig. 5 is a side elevation in detail showing the suspension of the plates and frame guide rails with the filter press in open position.
Figure 6:
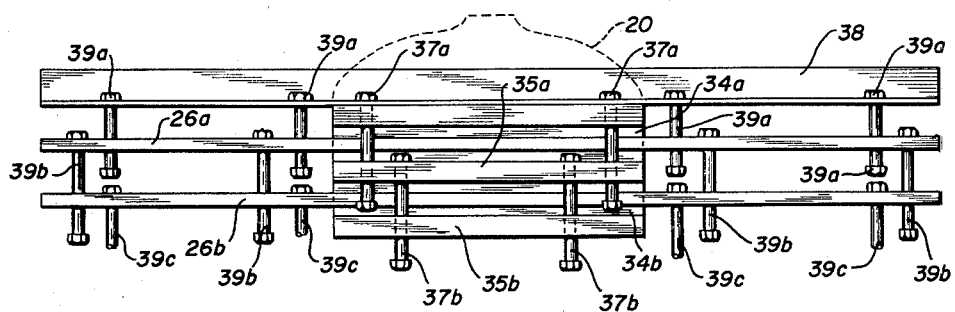
Fig. 6 is a detail similar to Fig. 5 showing the press in closed position.

The pressure filter of the invention includes a series of individual filter cells or units joined together to make a complete filter. As shown in Figs. 5 and 6, the plates of the individual filter cells are joined together and joined to plates of the next adjacent cell so that the plates of each cell may move to and from each other within a fixed distance. The plates may be moved from an abutting position where they may be clamped on the frames in filtering relation to a distance apart where the frames may move freely in and out of register with the plates. Filter cell a, shown in detail in Figs. 4, 5, and 6, comprises a frame 34a which is adapted for registering between head filter plate 20a and filter plate 35a. The plates 20a and 35a are secured together by means of bolts and nut assemblies 37 which permit the plates to move apart a distance slightly greater than the width of the frame 34a. The frame 34a is mounted on guide rails 26a for reciprocal movement in and out of register with the plates. The lower plate 35a is secured to upper plate 20a by the bolts 37, and plate 20a is secured to a lifter rail 38. The guide rail 26a is, likewise, secured to the lifter rail 38 by means of bolt and nut assemblies 29 at both ends thereof. The guide rail 26a carries the frame 34a and spaces it between the two plates as they move to and from one another. Filter cell b, which is the next adjacent cell to cell a, comprises a filter frame 34b, lower plate 35b and upper plate 35a. The frame 34b is mounted for reciprocal movement on a guide rail 26b for moving in and out of register with the plates. Plate 35b is secured to plate 35a by means of nut and bolt assemblies 37, which permits plate 35b to move to and from plate 35a within a fixed distance. The frame 34b is moved in and out of register with the open plates. The frame is moved along the guide rail from filtering position to cake dumping position beyond the plates. Ram frame 24a engages plate 34a and ram frame 24b engages frame 34b to move the same out of position between the plates. Each frame in the series has a similar ram unit for moving the frame out of the stack, and the front bars of the ram frame assembly 23 move the frames back into register with the plates into filtering position.

When the filter press is open, the lower plate of each series rests on the lower set of nuts of the bolt-nut assembly so that the two plates are held at their maximum distance apart as determined by the distance between the bolt and nut assemblies. The frame may then be moved in and out of register with the plates. Lower plate 35a, when the press is in open position, is spaced sufficiently from upper plate 20 so that the frame 34a may move freely in and out of register, and plate 35a is spaced from plate 35b so that the frame 34b may move freely in and out of register, etc. When the head plate 20 and its attached lifter rail 38 is moved downwardly, the plates successively engage the adjacent frames, in which position the unit may be secured in tight filtering relation. The filter is shown in closed position in Fig. 6, and in open position in Fig. 5. On opening the filter press, the plates and frames are progressively lifted from one another. For example, as head plate 20 and attached rail 38 is raised, upper plate 20a is first lifted off the frame 34a a distance determined by the bolt and nut assembly 39a secured between the rail 38 and rail 26a. As the head proceeds upwardly, guide rail 26a is lifted by means of the bolts 39a so that the carried frame 34a is lifted from lower frame 35a a distance determined by nut and bolt assembly 37a connecting the plates. As the head raises further, lower plate 35a is lifted from frame 34b by means of the bolts 37a. Guide rail 26b is next raised by bolt and nut assemblies 39b, lifting carried frame 34b from plate 35b. Bolt and nut assemblies 37b then engage plate 35b to lift it from the next lower frame, not illustrated in Figs. 5 and 6. Each plate and frame in the unit is spaced a fixed distance from its neighbor. The action continues progressively down the stack. On closing the frame, the reverse procedure occurs, as where the next immediate upper plate or frame is lowered onto its lower neighbor progressively from the bottom to the top of the filter. When the filter is closed the bolt-nut assemblies hang loosely in position, but when the press is open the bolts are under tension holding the plates and frames spaced apart.

When the filter is open, as illustrated in Fig. 5, by actuating the hydraulic cylinders 28 to move the ram-frame assembly toward the stacked plates and frames, the ram frames engage the filter frames to move them along guide rails 26 out of the stack into cake dumping position. As the filter frames leave the stack, the cake therein is dumped into the cake receptacle 31. Wash water or fluid may be introduced through inlet 29 into each section of the ram frame, and by having holes 33 spaced around the frame, the plates and retained filter medium may be washed. The washings from the filter are caught in the pan 30. In this manner, the filter medium 36 and the plates may be washed after the filter frames have been moved from the stack. The plate and frame press may therefore be broken down, cleaned, and reassembled in a fraction of the time required for conventional plate and frame filter presses. In place of the hand wheel 18, a hydraulic cylinder may obviously be utilized to further aid in shortening the cycle. When the filter is built for automatic operation, it is, also, opened and closed by means of hydraulic or air cylinders.

The filter frames may be placed directly onto a pallet rack as they are withdrawn from filtering position, instead of dumping the cake into the cake receptacle. Where such a pallet rack has shelves which are aligned with the open filter, the filter frames may be freely moved on and off the rack into correct alignment with the stacked plates. By having a series of removable shelves on the pallet rack, which interleave with the filter frames, the frames may be passed directly onto the pallet rack with the cake intact. Where desired, the pallet rack with the frames and cake may be placed directly in a compartment drier, or other suitable drier, and the cake dried in the frames. The dried cake may be easily dumped from the frames by removing the removable shelves from the pallet rack from the bottom up. The empty frames in the pallet rack may then be returned to the filter.

Figure 7:
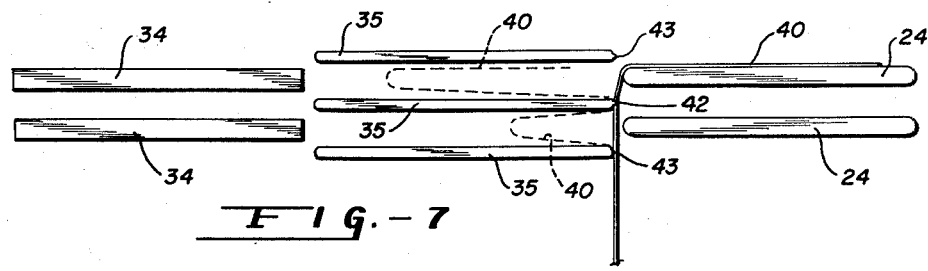
Fig. 7 is a schematic view illustrating the dressing of a filter plate with a filter cloth.
Figure 8:
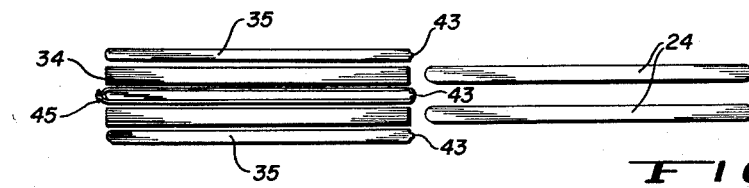
Fig. 8 is a schematic view of the device showing a plate dressed with a filter cloth and the frames in position to register therewith.
Figure 9:
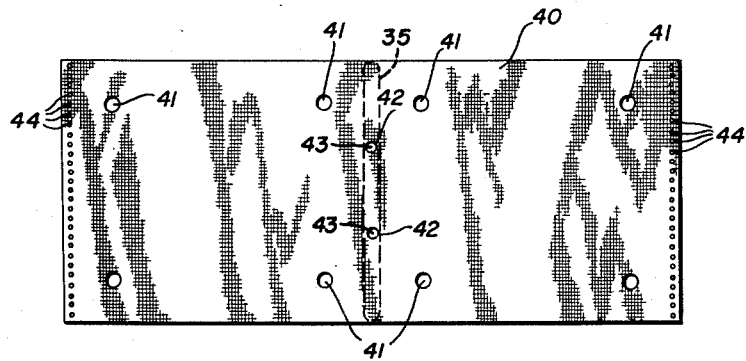
Fig. 9 is an improved filter cloth according to the present invention.

In assembled position, very little space is required between the fully spaced apart plates so that unduly large equipment is not needed. The space requirements between the plates is dictated by the width of the frames plus an additional small amount needed to permit free movement of the frames in and out of register with the plates. With such a small amount of space available, dressing the filter with conventional filter cloths is not feasible. According to the present invention, a filter medium is provided which may be used to easily and conveniently dress the plates, illustrated in Figs. 7 through 9. The filter medium of the present invention, which may be cloth, paper, wire gauze, and the like, comprises a panel 40 having a plurality of holes 41 therein to register with the fluid passages or channels in the plates and frames. A pair of centering eyelets 42 are provided centerwise of the panel. The centering eyelets 42 are adapted to register and telescope with pins 43 in the filter plates 35. The holes, or eyelets 42, hold the cloth in correct position on the plate when registered with the pins 43. Lacing holes 44 are provided for securing the panel securely around the plate. Lacing 45 secures the panel on the plate and prevents turning of the cloth in operating the filter press. To dress a plate, a panel 40 is placed over a ram frame 24 with the eyelet 42 in position to register with pins 43. The ram frame is then moved through the press dragging the panel 40 on both sides of the plate 35, as indicated in Fig. 7. When the ram frame reaches the end of its travel, the protruding edges of the panel are laced together to hold the panel securely on the plate. In place of the lacing, stapling or convenient type fastening may be utilized. Paper may, likewise, be dressed on the frame in a similar manner, and staples may be used to hold the paper in place. The paper normally is discarded with each cleaning of the press and it is removed and discarded with the cake and a new one dressed thereon. By perforating the midpoint of the paper along a line through eyelets 42, the paper is easily parted along the perforation so that it may be discarded along with the cake as the frame is pushed out by the ram frame.

The filter press as illustrated is shown with a movable head plate 20, however, the filter press may be made with a movable bottom plate, in which event the filter is opened by lowering the bottom plate and is closed by raising the bottom plate. In either case a hand screw, hydraulic or air cylinder or other mechanical means may be used for opening and closing the filter.

The quick opening feature may be utilized with a horizontal press as well as with a vertical press. With a horizontal press the frames are secured together in a similar manner with the bolt and nut assemblies so that moving one of the butt plates will progressively pull the plates apart into a predetermined spaced relation so that the frames may be removed for dumping the cake. The frames of the horizontal filter may be attached together for dropping them as a unit downwardly from the plates. The frames may be separate, as in a conventional filter, in which case, the individual frames are pulled upwardly out of the press. It is preferable, however, to move all the frames as a unit so as to speed up the filtering cycle. In either case whether the pressure filter is utilized in a vertical or a horizontal manner, the essential feature is to interconnect the plates so that the adjacent plates may move a limited fixed distance to and away from one another for interleaving the frames therebetween. By opening the filter press so as to space all the plates apart for free movement of the frames therebetween, the frames may be removed from the filter as a unit.

Figure 10:
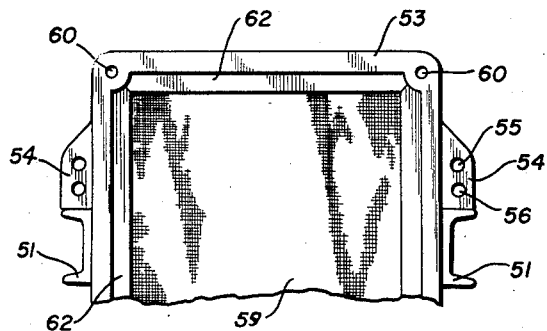
Fig. 10 is a partial plan view of a frame for a horizontal filter press according to the invention.
Figure 11:
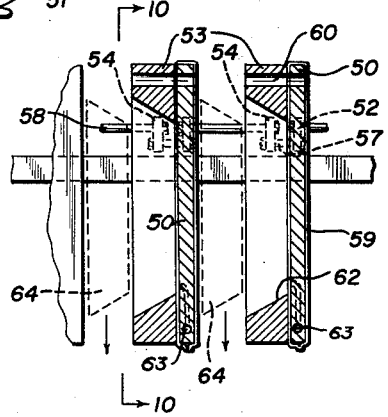
Fig. 11 is a detail of a horizontal plate and frame press utilizing the frame illustrated in Fig. 10.

A modified filter press, illustrated in Figs. 10 and 11, is adapted for use in a horizontal filter press, i.e., where the plates and frames are suspended in a substantially vertical position. The plates 50 are mounted on channels 51 by means of ears or lugs 52 on the sides of the plates. Filtering frames 53, having ears or lugs 54, are mounted on the channels 51 interleaved with the plates. Each lug on the plates and frames has two holes 55 and 56 adapted to register with the holes of the next adjacent member. A nut and bolt assembly 57 detachably joins a plate 50 and a frame 53. Each set of a plate and a frame is secured to its neighbor by a nut and bolt assembly 58. Filter media 59 is placed over each plate so as to cover each filtering face thereof, and to be held in position between each joined frame and plate. Feed and filtrate channels 60 are provided in the corners of the plates and frames to provide passage for slurry and filtrate. The internal surfaces 62 of the frames are tapered inwardly toward the attached plate, so as to form a cake which is smaller next to the attached plate 50. Blow back ports 63 are provided in each plate terminating behind the filter media held behind the attached plate and frame.

The joined plate and frame units are mounted on the channels, and each unit is secured to its neighbor by means of a bolt and nut assembly 58. The bolt and nut assembly 58 permits the units to move apart a distance slightly greater than the width of the frame 53. A cake 64, shown in dashed lines, is released from the frame by air under pressure through blow back ports 63. The blow back ports 63 terminate between the plate 50 and the filter media 59, and the air balloons the media 59 forcing the cake out of the frame 53. The bolt and nut assembly 58 provides a similar action to the vertical stack filter in that the plate and frame units are progressively pulled apart on movement of the butt plate of the filter. The interconnected units permit rapid and simple opening of the filter, and the interconnected plate and frame unit permits rapid and easy cake discharge. Such an arrangement is readily adaptable to automatic operation of the press.

Figure 12:
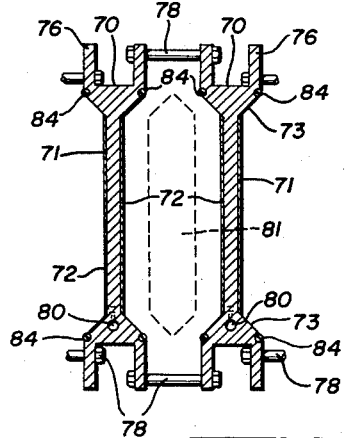
Fig. 12 is a side elevation, in section, of a modified horizontal filter press according to the invention.
Figure 13:
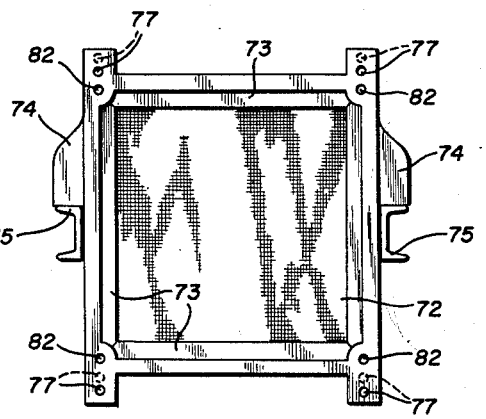
Fig. 13 is a plan view of the modified plates of the filter illustrated in Fig. 12.
Figure 14:
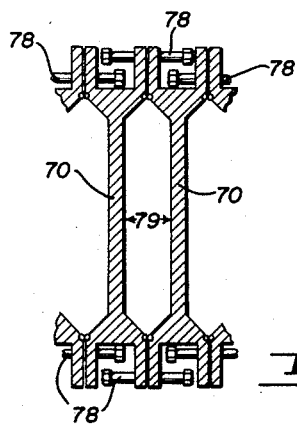
Fig. 14 is a detailed view, in cross section, of the device of Fig. 12 in closed position.

In the modified horizontal filter illustrated in Figs. 12 through 14, a chamber plate is employed which reduces the number of parts of the filter and simplifies both construction and operation. A chamber plate 70 in tight engagement with an identical neighbor performs the functions of both a plate and a frame. The plate 70 includes a center portion 71 having filter media 72 on each side thereof, and sloping sides 73 extending outwardly from all four sides of each face 71. A lug 74 is provided on each side of the plates for mounting them on a pair of channels 75. Ears 76 on each corner of the plate include a hole 77 for accommodating a nut and bolt assembly 78. The nut and bolt assembly 78 permits the plates 70 to be moved toward and away from one another a distance slightly greater than the maximum width 79 of the chamber formed between two engaging plates. A blow back port 80 is provided, terminating between the face 71 and the media 72 and each face of the plate 70 provides means for billowing the media to discharge cake 81 from the space between plates. Feed and filtrate channels 82 are provided for the filtering operation. To assure a tight seal between the plates, a gasket 84 may be provided along the contacting surfaces of adjoining plates.

The interconnected plates may be moved toward and away from each other by movement of the end plate of the filter. The plates may, therefore, be moved from a filtering relation to cake discharge position by movement of the end plate. In spaced apart position, i.e., cake discharge position, air is introduced in the blow back ports 80 to discharge the cake 81 from the unit. Since the filter may be opened and closed by movement of the end plate, the filter may be arranged for complete automatic operation.

The bevelled frame, illustrated in the horizontal modifications of the filter, may be advantageously used in the vertical stack filter, where the small side of the frame is placed at the top. The bevelling of the frame facilitates the discharge of the cake from the filter. In either the horizontal or vertical filter, the bevelling of the frame aids the discharge of the cake.

The vertical filter press provides a simple, positive cake removing means which deposits the cake, by gravity, in one convenient place out of the way of the filter unit. The plates and filter media may be washed and cleaned as a unit after the filter frames have been removed from the stack. The novel filter cloth of the invention, also, facilitates movement of the frames as a unit in and out of register with the plates. By securing the cloth in position on the plates, the filter press does not have to be redressed each time it is opened to dump the deposited cake.

The assembly has been illustrated as interconnected with bolt and nut assemblies for securing the parts together and permit the plates to move a fixed distance apart. It is obvious that other joining means may be used, as for example, rods with spaced holders, rivets, and the like. The essential feature is securing the plates together in a series in which adjacent plates may move a fixed distance. The connected plates may, therefore, be opened or spaced apart by moving an end plate of the series. The spacing of the plates permits movement of the frames as a unit to greatly reduce the time required to re-establish a plate and frame filter press in filtering condition. The interconnected plate and frame assembly of the invention may utilize automatic controls to provide for the first time a completely automatic plate and frame pressure filter.

While the invention has been described in reference to a specific device, there is no intent to limit the invention to the precise details set forth, except insofar as provided in the following claims.

I claim:
1. A pressure filter of the plate and frame type comprising an upright supporting structure, a plurality of filter plates mounted in said structure, each said plate being interconnected to its neighbor and mounted to move toward and away therefrom through a limited zone, a plurality of guide rails mounted on said structure and disposed in pairs along opposite sides of the plurality of plates with a pair of guide rails positioned to be maintained in alignment with each space between adjacent plates, each pair of said guide rails extending a substantial distance beyond said plates in at least one direction, a filter frame reciprocably mounted on each said pair of guide rails and movable along said guide rails into and out of the space between associated filter plates, means cooperative with said frames for substantially simultaneously moving the same along said guide rails to and from a filtering position between said plates and a cake discharge position beyond said plates, and means for moving one of the plates of the plurality toward and away from the plurality to thereby progressively transmit opening and closing movements to said interconnected plates.

2. A pressure filter according to claim 1 in which the plates of the series are disposed generally horizontally and each plate is mounted vertically above its next lower adjacent plate.

3. A pressure filter according to claim 1 in which the upper end plate of the series is moved for progressively transmitting opening and closing movements to the said plates.

4. A pressure filter according to claim 1 in which each pair of guide rail means is interlocked with the adjoining plates and arranged to move toward and away from the adjoining plates as the plates are moved and thereby remain substantially centerwise of the space between said plates.

5. A pressure filter according to claim 1 in which the means for moving the frames is a ram frame assembly arranged for simultaneously moving all of said frames into and out of alignment between said plates.

6. A pressure filter according to claim 1 in which each plate of the plurality of plates is connected to its adjacent neighbor on one side by a plurality of rods spaced about the periphery of the plates, and to its neighbor on the opposite side by another plurality of rods, said rods extending through and freely reciprocal in registering holes in each plate, and retaining means adjacent each end of said rods retaining said plates thereon within said limited zone.

References Cited in the file of this patent
UNITED STATES PATENTS

| | | |
|---|---|---|
| 629,642 | Wilson | July 25, 1899 |
| 683,196 | Bisbee | Sept. 24, 1901 |
| 734,898 | Lapp | July 28, 1903 |
| 891,393 | Bassler | June 23, 1908 |
| 996,537 | Sweetland | June 27, 1911 |
| 1,099,212 | Springer | June 9, 1914 |
| 1,107,487 | Brown | Aug. 18, 1914 |
| 1,337,251 | Miller | Apr. 20, 1920 |
| 1,370,470 | Martel | Mar. 1, 1921 |
| 1,678,704 | Morrison | July 31, 1928 |
| 2,598,061 | Knowlton | May 27, 1952 |
| 2,675,921 | Mathieu | Apr. 20, 1954 |
| 2,761,567 | Fischer | Sept. 4, 1956 |

FOREIGN PATENTS

| | | |
|---|---|---|
| 300,584 | Switzerland | Oct. 16, 1954 |